(12) United States Patent
Nakanishi et al.

(10) Patent No.: US 9,423,020 B2
(45) Date of Patent: Aug. 23, 2016

(54) SHIFT DEVICE

(75) Inventors: Kenji Nakanishi, Aichi (JP); Daisuke Yamamoto, Kanagawa (JP); Ryo Saito, Kanagawa (JP)

(73) Assignees: KABUSHIKI KAISHA TOKAI-RIKA-DENKI-SEISAKUSHO, Aichi (JP); Nissan Motor Co., Ltd., Kanagawa (JP)

( * ) Notice: Subject to any disclaimer, the term of this patent is extended or adjusted under 35 U.S.C. 154(b) by 242 days.

(21) Appl. No.: 14/346,972

(22) PCT Filed: Aug. 21, 2012

(86) PCT No.: PCT/JP2012/071097
§ 371 (c)(1),
(2), (4) Date: Mar. 25, 2014

(87) PCT Pub. No.: WO2013/047014
PCT Pub. Date: Apr. 4, 2013

(65) Prior Publication Data
US 2014/0238172 A1    Aug. 28, 2014

(30) Foreign Application Priority Data

Sep. 27, 2011    (JP) .................................. 2011-211335

(51) Int. Cl.
*F16H 59/10*    (2006.01)
*B60R 21/02*    (2006.01)
*F16H 59/02*    (2006.01)

(52) U.S. Cl.
CPC ............ *F16H 59/10* (2013.01); *B60R 21/0286* (2013.01); *F16H 2059/026* (2013.01); *F16H 2059/0291* (2013.01); *Y10T 74/2014* (2015.01)

(58) Field of Classification Search
CPC .............. F16H 9/00; F16H 9/02; F16H 9/08; F16H 9/10; F16H 2059/026; F16H 2059/047; F16H 2059/0273; F16H 2059/0291; B60K 20/00; B60R 21/02; B60R 21/0286; B60R 2021/0213; B60R 2021/0266; B60R 2021/0273; B60R 2021/0414; B60R 2021/065; Y10T 74/2014

USPC ........................................... 74/473.3, 473.33
See application file for complete search history.

(56) References Cited

U.S. PATENT DOCUMENTS 5,992,261 A * 11/1999 Iwata ..................... B60K 20/02
                                                                188/371
6,082,216 A *  7/2000 Watanabe ........... F16H 59/0278
                                                                74/473.3

(Continued)

FOREIGN PATENT DOCUMENTS

JP    10-059007 A    3/1998
JP    10-086689 A    7/1998

(Continued)

OTHER PUBLICATIONS

International Search Report PCT/JP2012/071097 mailed Oct. 24, 2012.

(Continued)

*Primary Examiner* — William Kelleher
*Assistant Examiner* — Leonard J Archuleta
(74) *Attorney, Agent, or Firm* — Roberts Mlotkowski Safran Cole & Calderon, PC

(57) ABSTRACT

In a shift lever device, a width dimension of left ribs and right ribs is set larger than a diameter dimension of a left support shaft portion and a right support shaft portion. In the event of an impact load being imparted to a shift lever in different directions to a control lever axial direction, the left rib and the right rib are broken in this impact load direction since the left rib and the right rib are formed so as to face the whole diameter of the left support shaft portion and the right support shaft portion. Impact load can accordingly be absorbed even in the event that an impact load is imparted to the shift lever in different directions to a control lever axial direction. Namely, impact load can be absorbed for impact load directions within a range of a specific angle. Dependency on the impact load direction is accordingly suppressed when absorbing an impact load imparted to the shift lever.

14 Claims, 13 Drawing Sheets

(56) References Cited

U.S. PATENT DOCUMENTS

| | | | | |
|---|---|---|---|---|
| 6,286,385 | B1 * | 9/2001 | Nishimura | F16H 59/10 180/271 |
| 6,325,196 | B1 * | 12/2001 | Beattie | F16H 59/0204 192/220.4 |
| 6,431,339 | B1 * | 8/2002 | Beattie | F16H 59/0204 192/220.4 |
| 6,568,295 | B2 * | 5/2003 | Matsuno | F16H 59/0208 74/473.3 |
| 6,584,870 | B2 * | 7/2003 | Nishimura | F16H 59/10 180/271 |
| 7,730,802 | B2 * | 6/2010 | Takikawa | F16H 59/10 74/473.1 |
| 7,854,179 | B2 * | 12/2010 | Shimizu | F16H 59/02 74/473.1 |
| 7,997,548 | B2 * | 8/2011 | Sugiyama | B60K 20/02 248/174 |
| 9,127,761 | B2 * | 9/2015 | Sasaki | F16H 59/02 |
| 9,255,636 | B2 * | 2/2016 | Nakanishi | B60K 20/02 |
| 2001/0037700 | A1 | 11/2001 | Nishimura et al. | |
| 2010/0077883 | A1 * | 4/2010 | Heo | B60R 21/09 74/473.36 |
| 2015/0101448 | A1 * | 4/2015 | Nakanishi | B60K 20/02 74/522.5 |
| 2016/0116057 | A1 * | 4/2016 | Nakanishi | F16H 59/02 74/473.3 |

FOREIGN PATENT DOCUMENTS

| | | | | |
|---|---|---|---|---|
| JP | 11-278085 | A | 12/1999 | |
| JP | 2000-343977 | A | 12/2000 | |
| JP | 2006-131030 | A | 5/2006 | |
| JP | 2006137220 | A | 6/2006 | |
| JP | EP 1529676 | A3 * | 6/2006 | B60R 21/09 |
| JP | 2009-006910 | A | 1/2009 | |

OTHER PUBLICATIONS

Extended European Search Report dated Jun. 10, 2015.

* cited by examiner

SHIFT DEVICE

TECHNICAL FIELD

The present invention relates to a shift device provided with a weakened portion.

BACKGROUND ART

In a transmission operation device for vehicle described in Patent Document 1 mentioned below, a shift lever is supported on a transmission operation device body through a pin so as to be capable of rotating. Moreover, a lateral wall of the transmission operation device is formed with plural ribs at specific intervals therebetween. In the event of an impact load greater than the mechanical strength of the ribs being imparted to the shift lever, the ribs are accordingly broken (destroyed), enabling the impact load to be absorbed.

PRIOR ART DOCUMENT

Patent Document

Patent Document 1: Japanese Patent Application Laid-Open (JP-A) No. 2006-131030

SUMMARY OF INVENTION

The Problem to be Solved by the Invention

However, the plural ribs are disposed along one direction of the impact load, and a width dimension of the rib is set with substantially the same dimension as a diameter dimension of the pin. Accordingly, in the event of an impact load being imparted to the shift lever in a different direction to the one direction, there is a possibility of the ribs not being broken and being unable to absorb the impact load imparted to the shift lever, since the ribs are not formed on the impact load acting direction side of the pin with respect to the whole diameter of the pin. There is accordingly a problem of impact load direction dependency when absorbing an impact load that has been imparted to the shift lever in this transmission operation device for vehicle described above.

In consideration of the above circumstances, an object of the present invention is to provide a shift device capable of suppressing dependency on the impact load direction when absorbing an impact load that has been imparted to a shift operation member.

Means for Solving the Problem

A shift device of a first aspect includes: a shift operation member that includes a support shaft portion provided along a vehicle width direction, and that is configured to be capable of rotation operation about an axis of the support shaft portion; a support body that includes a support portion that supports the support shaft portion rotatably; and a weakened portion that is provided at the support body, the weakened portion extending around a circumferential direction of the support portion at a lower side in an axial direction of the shift operation member and at a periphery of the support portion, and a width dimension of the weakened portion being set larger than a diameter dimension of the support shaft portion.

In the shift device according to the first aspect, the support shaft portion of the shift operation member is supported on the support portion of the support body so as to be capable of rotating, and the shift operation member is rotate-operated about the axis of the support shaft portion. In the support body, the weakened portion is provided at the lower side in the axial direction of the shift operation member and at the periphery of the support portion. In the event of an impact load greater than the mechanical strength of the weakened portion being imparted to the shift operation member, the weakened portion is broken (destroyed), thereby absorbing the impact load imparted to the shift operation member.

Note that the weakened portion extends around the circumferential direction of the support portion, and that the width dimension of the weakened portion is set larger than the diameter dimension of the support shaft portion. The weakened portion is accordingly provided so as to face the whole diameter of the support shaft portion within a specific range about the axis of the support shaft portion. The weakened portion is accordingly broken by impact load in directions within the specific range.

A shift device of a second aspect is the shift device of the first aspect, wherein plural weakened portions are provided along a direction separated from the support shaft portion.

In the shift device according to the second aspect, plural weakened portions are provided along the separation direction from the support shaft portion. The weakened portions are accordingly broken in an intermittent manner in the event of the impact load greater than the mechanical strength of the weakened portions being imparted to the shift operation member. The impact load imparted to the shift operation member can accordingly be absorbed in an intermittent manner according to the size of the impact load.

A shift device of a third aspect is the shift device of the second aspect, wherein width dimensions of the weakened portions are set so as to increase the further the weakened portions are disposed in the direction separated from the support shaft portion.

In the shift device according to the third aspect, each of the weakened portions can be provided so as to face the whole diameter of the support shaft portion within the specific range about the axis of the support shaft portion due to setting the width dimensions of the weakened portions so as to increase the further the weakened portions are disposed in the separation direction from the support shaft portion. The weakened portions can accordingly be reliably broken by impact load in directions within the specific range.

A shift device of a fourth aspect is the shift device of the second aspect, wherein width dimensions of the weakened portions are set so as to decrease the further the weakened portions are disposed in the direction separated from the support shaft portion.

In the shift device according to the fourth aspect, the width dimensions of the weakened portions are set so as to decrease the further the weakened portions are disposed in the separation direction from the support shaft portion. Movement of the support shaft portion is accordingly guided by the weakened portions when the support shaft portion moves with braking the weakened portions.

A shift device of a fifth aspect is the shift device of any one of the second aspect to the fourth aspect, further including a thinned portion that is provided at the weakened portion, a thickness dimension of the thinned portion being set smaller than a thickness dimension of the weakened portion.

In the shift device according to the fifth aspect, the weakened portion is provided with the thinned portion. The thickness dimension of the thinned portion is set smaller than the thickness dimension of the weakened portion. The weakened portion accordingly breaks more readily at the location of the thinned portion in the event of the impact load being imparted to the shift operation member. Movement of the shift operation member can accordingly be guided during impact load absorption by the positions where the thinned portions are formed at the weakened portions.

A shift device of a sixth aspect is the shift device of any one of the second aspect to the fourth aspect, further including a projection portion that is provided at the weakened portion and that projects out towards a weakened portion disposed at an opposite side of the weakened portion from the support shaft portion.

In the shift device according to the sixth aspect, the weakened portions is provided with the projection portion. The projection portion projects out towards a weakened portion disposed on the opposite side of the weakened portion to the support shaft portion. Accordingly, in the event of the impact load being imparted to the shift operation member, the projection portion abuts the adjacent weakened portion, and the weakened portion breaks more readily at the this contacted location. Movement of the shift operation member during impact load absorption can accordingly be guided by the positions where the projection portions are formed at the weakened portions.

A shift device of a seventh aspect is the shift device of any one of the fourth aspect to the sixth aspect, further including a coupling body that is rotatably supported on the support body, that includes a coupling portion coupled to the shift operation member, that is rotated interlockingly with the rotation operation of the shift operation member, and that is configured to enable detection of a position to which the shift operation member is operated by being rotated, wherein the shift operation member destroys the coupling portion in a case in which an impact load is imparted to the shift operation member.

In the shift device according to the seventh aspect, the coupling body is supported on the support body so as to be capable of rotating. The coupling body is coupled to the shift operation member by the coupling portion, and rotates interlockingy to the rotate operation of the shift operation member. The position (shift position) to which the shift operation member has been operated is detected due to the coupling body rotating.

The coupling portion is destroyed by the shift operation member in the event of the impact load being imparted to the shift operation member. The interlocking between the coupling body and the shift operation member is thereby released. False detection of the position to which the shift operation member has been operated is accordingly suppressed or prevented since the coupling body does not rotate interlockingly to the shift operation member during absorption of the impact load that has been imparted to the shift operation member.

A shift device of an eighth aspect is the shift device of the seventh aspect, wherein the coupling portion is formed in a shaft shape, and a coupling hole into which the coupling portion is inserted is formed at the shift operation member.

In the shift device according to the eighth aspect, the coupling portion is formed in a shaft shape, and the coupling member is inserted into the coupling hole formed in the shift operation member. Accordingly, for example in the event of the impact load being imparted to the shift operation member, the interlocking between the coupling body and the shift operation member is released due to the coupling member being broken off (destroyed) by the coupling hole. The coupling body and the shift operation member can accordingly be coupled together, and the interlocking between the coupling body and the shift operation member can also be released, with a simple configuration.

A shift device of a ninth aspect is the shift device of any one of the second aspect to the eighth aspect, further including an inclined portion that is provided at an edge portion at an inner side of the weakened portion, and that is inclined towards the direction separated from the support shaft portion on progression towards the inner side of the weakened portion.

In the shift device according to the ninth aspect, the inclined portion is provided at the edge portion inside the weakened portion, with the inclined portion inclined towards the direction of separation from the support shaft portion on progression towards the weakened portion inside. The shift operation member accordingly moves smoothly in the event that the impact load is imparted to the shift operation member and the weakened portions are broken.

Advantageous Effects of Invention

According to the shift device of the first aspect, dependency on the impact load direction when absorbing an impact load imparted to the shift operation member can be suppressed.

According to the shift device of the second aspect, an impact load that has been imparted to a shift operation member can be effectively absorbed due to absorbing the impact load in an intermittent manner according to the size of the impact load.

According to the shift device of the third aspect, the weakened portions can be broken reliably in the direction of an impact load.

According to the shift device of the fourth aspect, the movement direction of the shift operation member can be set by the weakened portions when absorbing an impact load.

According to the shift device of the fifth aspect, the movement direction of the shift operation member can be set by the thinned portion when absorbing an impact load.

According to the shift device of the sixth aspect, the movement direction of the shift operation member can be set by the projection portion when absorbing an impact load.

According to the shift device of the seventh aspect, false detection of the operation position of the shift operation member can be suppressed or prevented when absorbing impact load imparted to the shift operation member.

According to the shift device of the eighth aspect, the coupling body and the shift operation member can be coupled together, and interlocking between the coupling body and the shift operation member can also be released, with a simple configuration.

According to the shift device of the ninth aspect, the shift operation member can move smoothly as the weakened portions are broken.

DESCRIPTION OF EMBODIMENTS OF THE INVENTION

Embodiment

Figure 1:
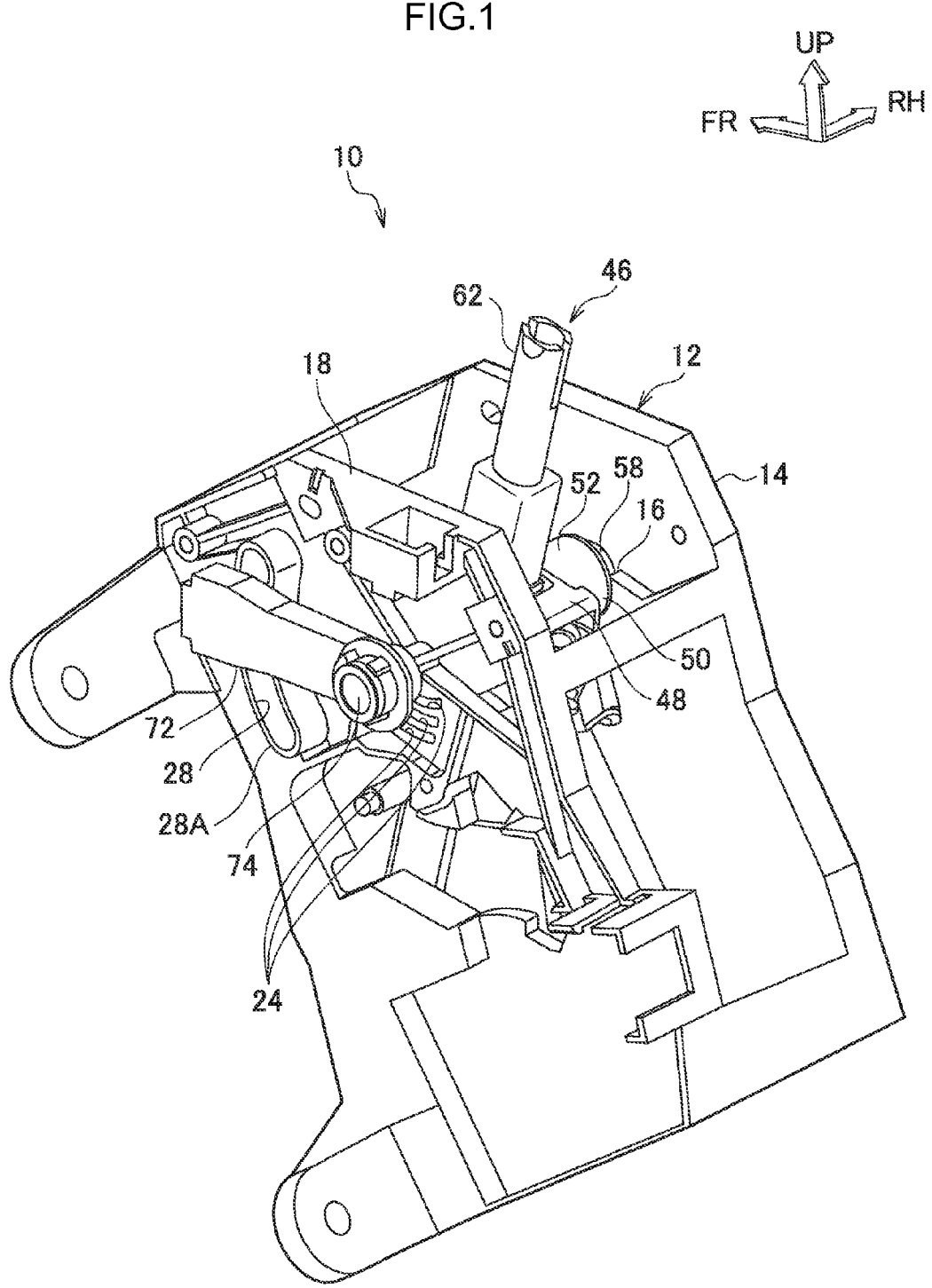
FIG. 1 A perspective view illustrating relevant portions of a shift lever device according to a present exemplary embodiment as viewed from the diagonal rear left of a vehicle.
Figure 2:
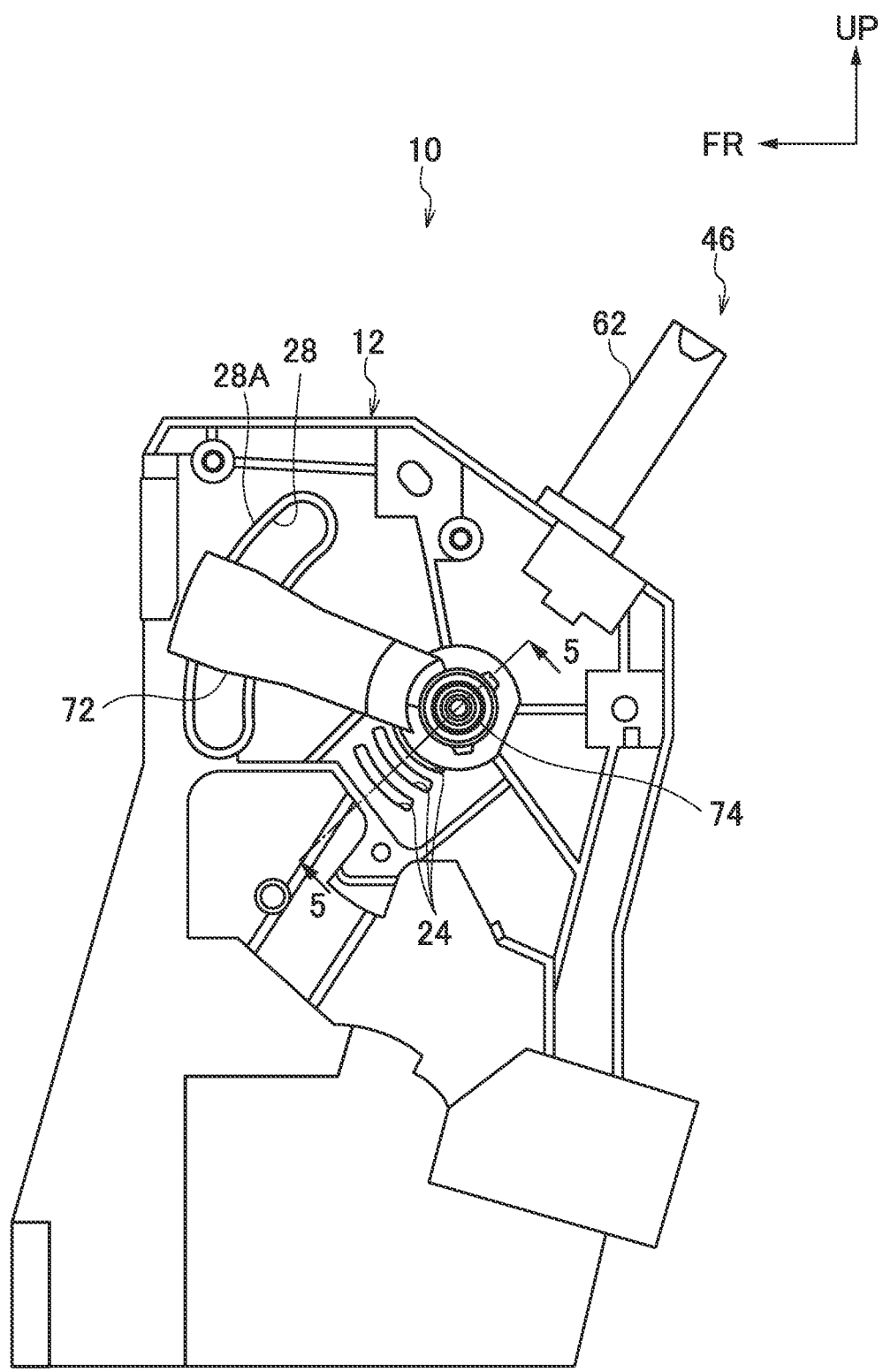
FIG. 2 A side view of the shift lever device illustrated in FIG. 1, as viewed from the left of the vehicle.
Figure 3:
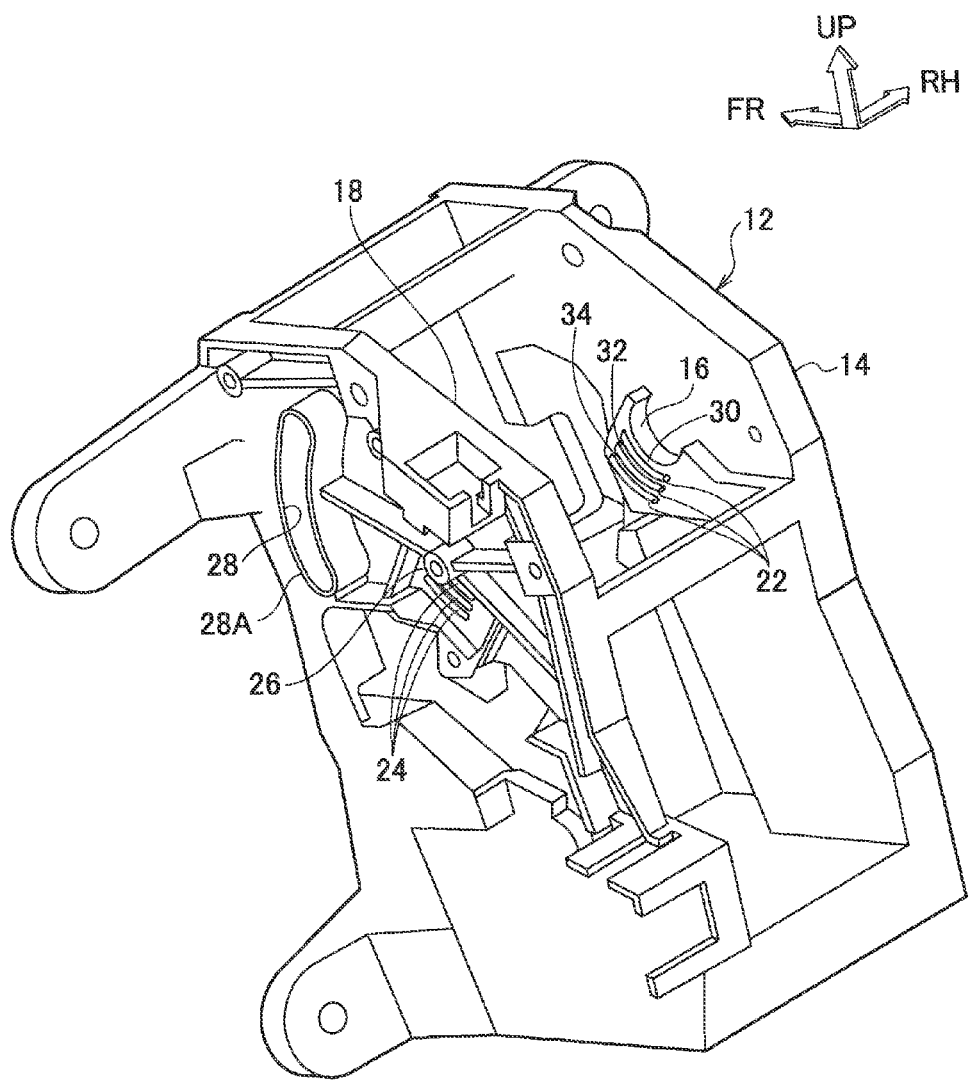
FIG. 3 A perspective view illustrating housing employed in the shift lever device illustrated in FIG. 1, as viewed from the diagonal rear left of the vehicle.
Figure 4:
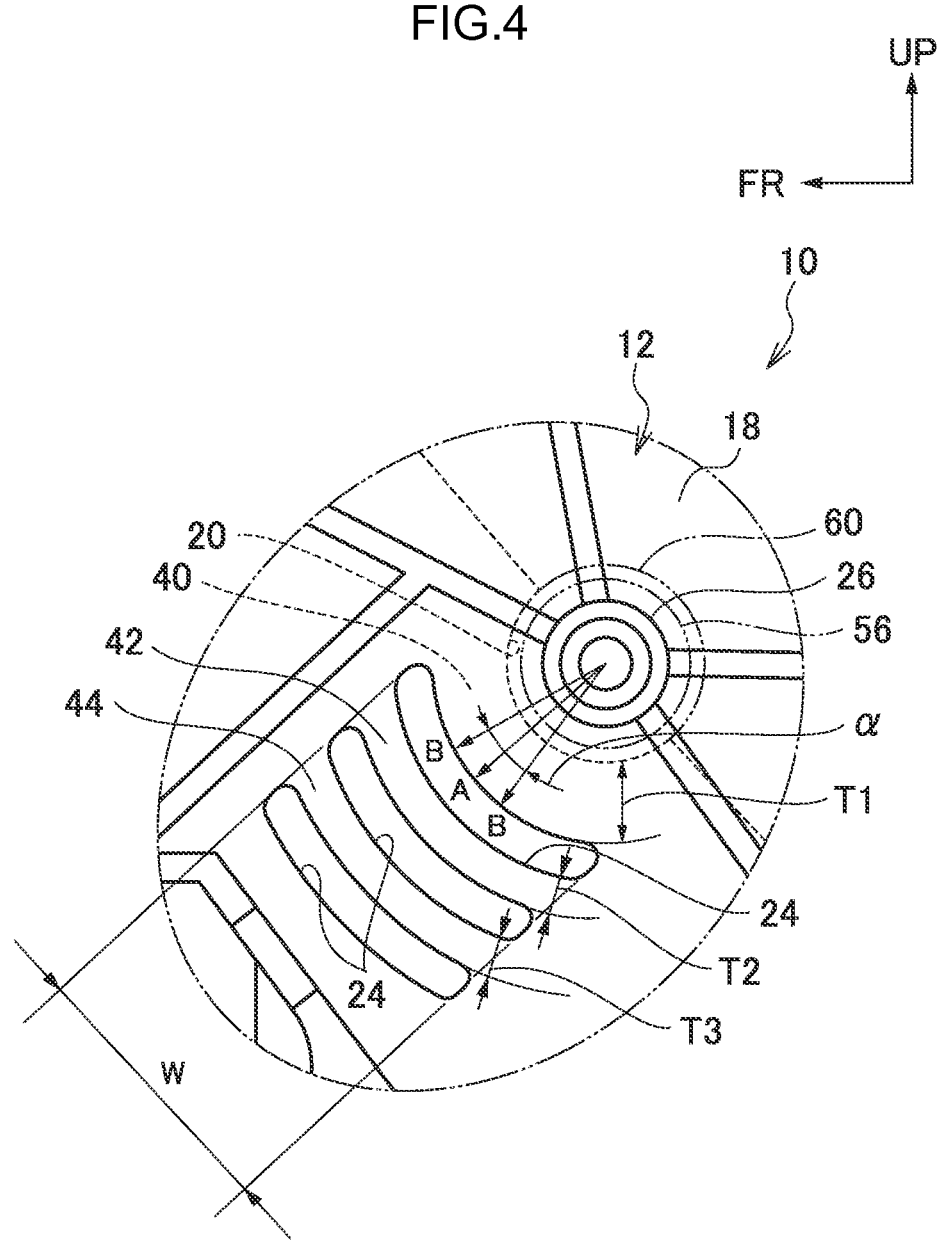
FIG. 4 An enlarged side view illustrating left ribs of the housing illustrated in FIG. 3.
Figure 5:
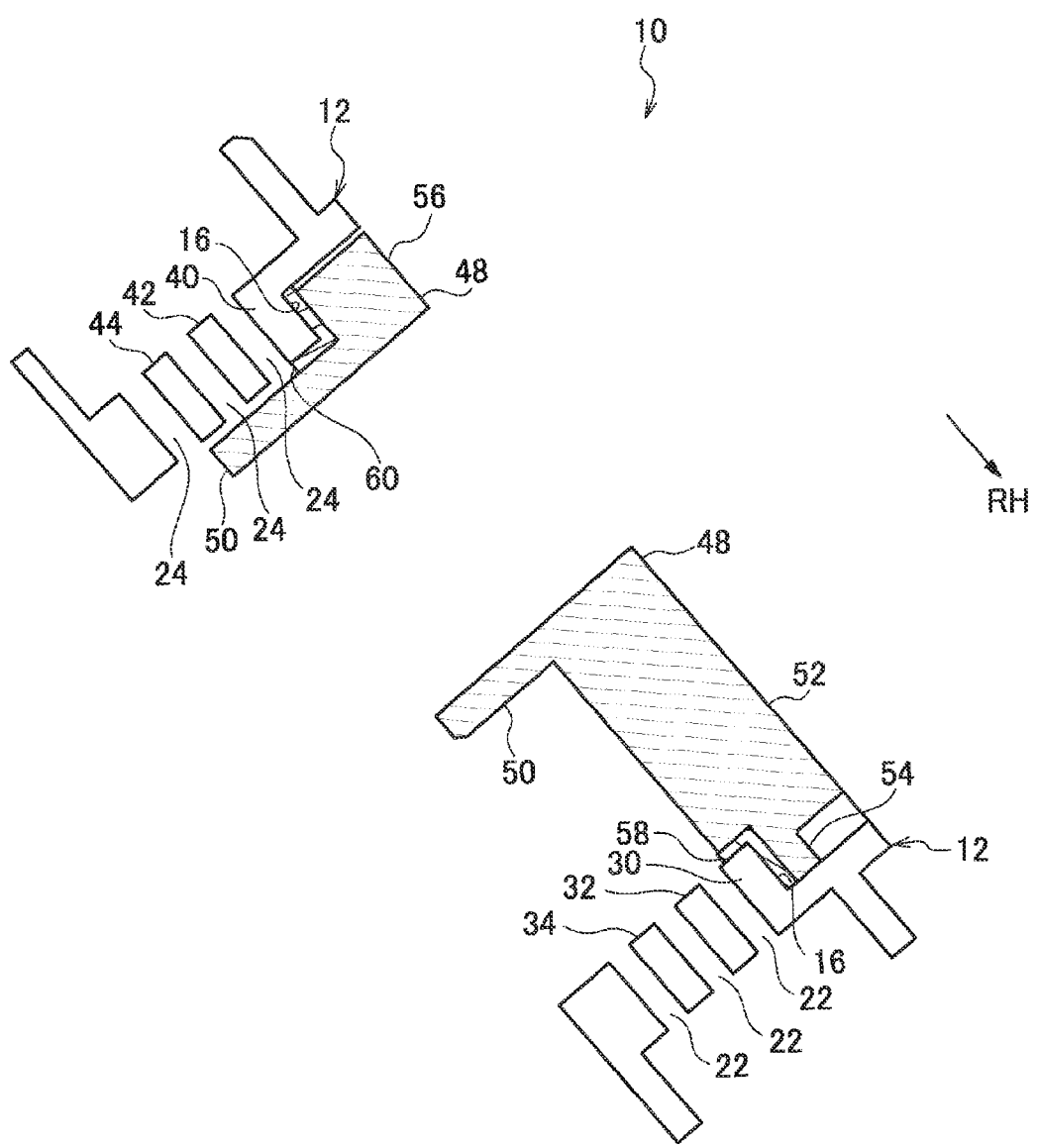
FIG. 5 A partial cut-away cross-section (a cross-section taken along line 5-5 in FIG. 2) illustrating a portion of the shift lever device illustrated in FIG. 2.
Figure 6:
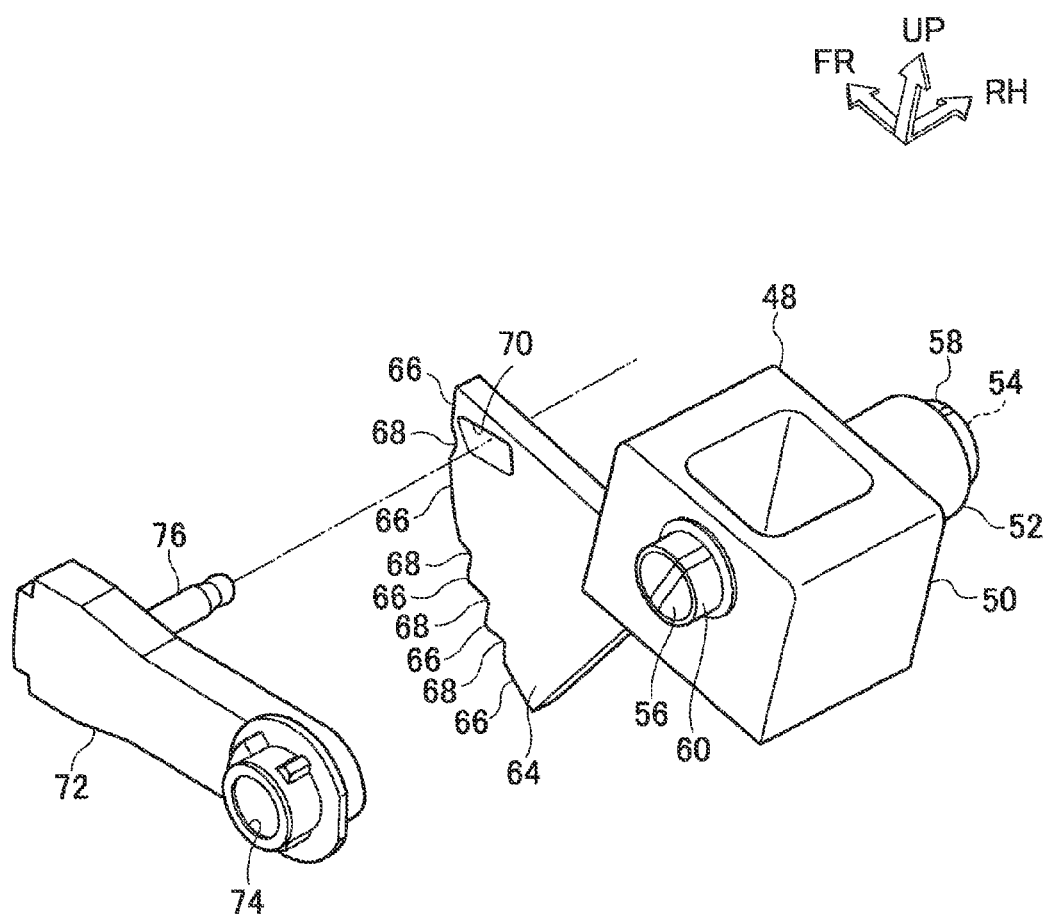
FIG. 6 A perspective view illustrating a control shaft and a shift position link employed in the shift lever device illustrated in FIG. 1, as viewed from the diagonal rear left of the vehicle.

FIG. 1 is a perspective view illustrating relevant portions of a shift lever device 10 that serves as a shift device according to an embodiment of the present invention, as viewed from the diagonal rear left of a vehicle. FIG. 2 is a side view illustrating the shift lever device 10 as viewed from the left of the vehicle. FIG. 3 is a perspective view illustrating housing 12 that is used in the shift lever device 10, as viewed from the diagonal rear left of the vehicle. FIG. 4 is a side view illustrating left ribs 40, 42, 44 of the housing 12. Note that in the drawings, arrow FR indicates the vehicle front, arrow RH indicates the vehicle right direction (one vehicle width direction side), and arrow UP indicates upwards.

As illustrated in these drawings, the shift lever device 10 is provided with the housing 12 that serves as a support body. The housing 12 is formed in a substantially rectangular parallelopiped box shape, and is disposed inside an instrument panel of the vehicle.

A right side wall 14 of the housing 12 is provided with a right shaft receiving portion 16 that serves as a support portion. The right shaft receiving portion 16 is formed with a substantially semicircular cross-section profile, and is open diagonally upwards, and the right shaft receiving portion 16 projects out from the right side wall 14 towards the vehicle left direction. A left side wall 18 of the housing 12 is provided with a left shaft receiving portion 20 serving as a support portion (see FIG. 4). The left shaft receiving portion 20 is formed with a substantially semicircular cross-section profile, and is open diagonally upwards, and the left shaft receiving portion 20 projects out from the left side wall 18 towards the vehicle right direction. The left shaft receiving portion 20 is disposed coaxially to the right shaft receiving portion 16, and a radius dimension of the left shaft receiving portion 20 and a radius dimension of the right shaft receiving portion 16 are set with the same dimensions.

In the right side wall 14 and in the left side wall 18, plural (3 in the present exemplary embodiment) substantially elongated track shaped elongated holes 22 and elongated holes 24 are formed penetrating, below the right shaft receiving portion 16 and the left shaft receiving portion 20. The elongated holes 22 and the elongated holes 24 are formed so as to curve following the circumferential direction of the right shaft receiving portion 16 and the left shaft receiving portion 20, and are respectively disposed at the right shaft receiving portion 16 and the left shaft receiving portion 20, with specific intervals therebetween, heading towards the radial direction outside of the right shaft receiving portion 16 and the left shaft receiving portion 20. The right side wall 14 and the left side wall 18 are thus respectively configured with right ribs 30, 32, 34 and the left ribs 40, 42, 44 that serve as weakened portion extending around the circumferential direction of the right shaft receiving portion 16 and the left shaft receiving portion 20. The right ribs 30, 32, 34 and the left ribs 40, 42, 44 are formed so as to be the same in shape.

A width dimension W of the left ribs 40, 42, 44 (right ribs 30, 32, 34) is set larger than an external diameter dimension (diameter) of a left collar 60 and a left support shaft portion 56 of a control shaft 48, described later. Moreover, a thickness dimension T2 of the left rib 42 (right rib 32) is set so as to be the same dimension to a thickness dimension T3 of the left rib 44 (right rib 34). A thickness dimension T1 of the left rib 40 (right rib 30) is set so as to be slightly larger than the thickness dimension T2 of the left rib 42 (right rib 32) (see FIG. 4).

The left side wall 18 of the housing 12 is integrally provided with a substantially circular cylinder shaped boss 26. The boss 26 is disposed coaxially to the left shaft receiving portion 20, and projects out from the left side wall 18 towards the vehicle left direction. A substantially elongated track shaped insertion through hole 28 is formed penetrating the left side wall 18 at a vehicle front position with respect to the boss 26. The insertion through hole 28 is disposed so as to curve following the circumferential direction of the boss 26. In the left side wall 18, a flange portion 28A is provided standing at a peripheral edge portion of the insertion through hole 28. The flange portion 28A projects out from the left side wall 18 towards the vehicle left direction.

As illustrated in FIG. 1, FIG. 2, FIG. 5 and FIG. 6, a shift lever 46 serving as a shift operation member is provided inside the housing 12. The shift lever 46 includes the substantially block shaped control shaft 48. The control shaft 48 is provided with a substantially rectangular tube shaped main body portion 50. The main body portion 50 is provided with a substantially circular column shaped right shaft portion 52. The right shaft portion 52 projects out from the main body portion 50 towards the vehicle right direction. A substantially circular cylinder shaped right support shaft portion 54 is provided coaxially to the right shaft portion 52 at a leading end of the right shaft portion 52, the right support shaft portion 54 projecting out from the right shaft portion 52 towards the vehicle right direction. A substantially circular cylinder shaped right collar 58 is inserted to the right support shaft portion 54, and the right support shaft portion 54 is supported so as to be capable of rotating on the right shaft receiving portion 16 of the housing 12 via the right collar 58.

The main body portion 50 is moreover provided with the substantially circular column shaped left support shaft portion 56. The left support shaft portion 56 is disposed coaxially to the right support shaft portion 54, and projects out from the main body portion 50 towards the vehicle left direction. A diameter dimension of the left support shaft portion 56 is set with the same dimension to the external diameter dimension of the right support shaft portion 54. A substantially circular cylinder shaped left collar 60 is inserted to the left support shaft portion 56. The external diameter dimension of the left collar 60 is set with the same dimension to the external diameter dimension of the right collar 58. The left support shaft portion 56 is supported so as to be capable of rotating on the left shaft receiving portion 20 of the housing 12 via the left collar 60. Due to this, the control shaft 48 is supported on the housing 12 so as to be capable of rotating along the vehicle front-rear direction (shift direction) about the axes of the right support shaft portion 54 and the left support shaft portion 56.

A substantially elongated rod shaped control lever 62 configuring the shift lever 46 is inserted tube-inside the main body portion 50. The control lever 62 is supported by the main body portion 50 so as to be capable of rotating along the vehicle width direction (select direction). The control lever 62 is moreover configured so as to be capable of rotating integrally with the main body portion 50 along the shift direction. The shift lever 46 (the control lever 62 and the control shaft 48) is accordingly rotated about the axes of the right support shaft portion 54 and the left support shaft portion 56 when the control lever 62 is operated along the shift direction.

A cover, not illustrated in the drawings, is provided above the control lever 62. An operation groove, not illustrated in the drawings, is formed penetrating the cover. The operation groove is formed with a specific zigzag shape extending along the shift direction and the select direction. The control lever 62 passes through the inside of the operation groove, such that the shift position of the shift lever 46 can be changed to a "P" shift position (parking position), an "R" shift position (reverse position), an "N" shift position (neutral position), and a "D" shift position (drive position) by operating the shift lever 46 to follow the operation groove. A shift knob, not illustrated in the drawings, is moreover fixed to an upper portion of the control lever 62.

Note that the right ribs 30, 32, 34 and the left ribs 40, 42, 44 of the housing 12 mentioned above are disposed along the axial direction of the control lever 62 when the shift lever 46 is disposed in the "D" shift position.

In the main body portion 50 of the control shaft 48, a substantially fan shaped retainer portion 64 is integrally provided. The retainer portion 64 projects out from the main body portion 50 towards the vehicle front. Plural detent mounds 66 are provided to an outer peripheral portion of the retainer portion 64, with detent grooves 68 formed between the respective detent mounds 66. A detent spring, not illustrated in the drawings, that is provided at the housing 12, engages with the inside of the detent grooves 68, thereby achieving a configuration that imparts an indexing sensation when the shift lever 46 is operated to the respective shift positions. A substantially rectangular shaped coupling hole 70 is formed penetrating a vehicle front portion of the retainer portion 64, and a coupling pin 76 of a shift position link 72, described later, is fit-inserted inside the coupling hole 70.

The substantially rectangular parallelopiped block plate shaped shift position link 72 that serves as a coupling body is provided to the vehicle left direction of the housing 12. A substantially circular shaped support hole 74 is formed penetrating one end portion (a vehicle rear end portion) of the shift position link 72, and the boss 26 of the housing 12 is inserted into the support hole 74. The shift position link 72 is thereby supported on the housing 12 so as to be capable of rotating.

In the other end portion of the shift position link 72 (a vehicle front end portion), the substantially shaft shaped coupling pin 76 that serves as a coupling portion is integrally provided. The coupling pin 76 projects out from the shift position link 72 towards the vehicle right direction, and is inserted through the insertion through hole 28 of the housing 12, with a leading end portion of the coupling pin 76 fit-inserted inside the coupling hole 70 of the control shaft 48. The shift position link 72 and the control shaft 48 are accordingly coupled together, such that when the shift lever 46 is rotated along the shift direction, the shift position link 72 is rotated about the axis of the boss 26 interlocking to rotating of the shift lever 46 due to an inner peripheral portion of the coupling hole 70 pressing the coupling pin 76. Moreover, a sensor board, not illustrated in the drawings, is provided at the vehicle left direction side of the shift position link 72. A magnetic sensor (an element that may broadly be considered as a "detection portion"), not illustrated in the drawings, is disposed on the sensor board at a position facing the shift position link 72. Configuration is thereby made wherein the shift position to which the shift lever 46 has been operated can be detected by the magnetic sensor detecting a rotate-position of the shift position link 72 when the shift position link 72 has been rotated.

Explanation follows regarding operation of the present embodiment.

When the vehicle is traveling, the shift lever 46 is positioned in the "D" shift position. In this state, in the event that an impact load is imparted to the shift lever 46 in the axial direction of the control lever 62 (in the direction of arrow A in FIG. 4), this impact load is imparted from the right support shaft portion 54 and the left support shaft portion 56 of the control shaft 48 via the right collar 58 and the left collar 60 to the right shaft receiving portion 16 and the left shaft receiving portion 20 of the housing 12. The right rib 30 and the left rib 40 break (are destroyed) in a case in which this impact load is greater than the mechanical strength of the right rib 30 and the left rib 40.

When the right rib 30 and the left rib 40 break, the broken right rib 30 and the left rib 40 respectively abut the right rib 32 and the left rib 42, and the right rib 32 and the left rib 42 are broken. Moreover, the broken right rib 32 and left rib 42 respectively abut the right rib 34 and the left rib 44, and the right rib 34 and the left rib 44 are broken. The impact energy imparted to the shift lever 46 is accordingly converted into the energy breaking the right ribs 30, 32, 34 and the left ribs 40, 42, 44, thereby absorbing the impact load imparted to the shift lever 46.

Next, in the event that an impact load is imparted to the shift lever 46 in a different direction to the control lever 62 axial direction (in the directions of the arrows B in FIG. 4) in a state in which the shift lever 46 has been operated to the "D" shift position, this impact force is imparted from the right support shaft portion 54 and the left support shaft portion 56 of the control shaft 48 via the right collar 58 and the left collar 60 to the right shaft receiving portion 16 and the left shaft receiving portion 20 of the housing 12 similarly to as described above.

Note that the width dimension W of the right ribs 30, 32, 34 and the left ribs 40, 42, 44 is set larger than the diameter (external diameter) dimension of the right support shaft portion 54 and the diameter dimension of the left support shaft portion 56 respectively. Since the right rib 30 and the left rib 40 are respectively formed, so as to face the whole diameters of the right support shaft portion 54 and the left support shaft portion 56, at the sides of the right support shaft portion 54 and the left support shaft portion 56 towards direction which the impact load acts, the right rib 30 and the left rib 40 are broken in the direction of this impact load.

When the right rib 30 and the left rib 40 are broken, the broken right rib 30 and left rib 40 respectively abut the right rib 32 and the left rib 42, and the right rib 32 and the left rib 42 are broken. Moreover, the broken right rib 32 and left rib 42 respectively abut the right rib 34 and the left rib 44, and the right rib 34 and the left rib 44 are broken. The impact energy imparted to the shift lever 46 is accordingly converted into the energy breaking the right ribs 30, 32, 34 and the left ribs 40, 42, 44, thereby absorbing the impact load imparted to the shift lever 46.

Impact load can accordingly be absorbed even in the event that an impact load is imparted to the shift lever 46 in a different direction to the control lever 62 axial direction in a state in which the shift lever 46 is disposed in the "D" shift position. Namely, impact load can be absorbed with respect to impact load directions within the range of the specific angle α illustrated in FIG. 4. It is accordingly possible to suppress dependency on the impact load direction when absorbing impact load imparted to the shift lever 46.

Moreover, supposing the shift lever device 10 were to be installed to a different vehicle so even at a different installation angle of the shift lever device 10 with respect to the vehicle, impact load can be absorbed correspondingly to impact load imparted to the shift lever 46 within the range of the specific angle α. The shift lever device 10 can accordingly be applied to vehicles that have different installation angles, enabling common application of the shift lever device 10 to be achieved.

The right side wall 14 of the housing 12 is provided with the 3 right ribs 30, 32, 34, and the left side wall 18 of the housing 12 is provided with the 3 left ribs 40, 42, 44. Impact load can accordingly be absorbed in an intermittent manner according to the size of the impact load imparted to the shift lever 46 due to the right ribs 30, 32, 34 and the left ribs 40, 42, 44 breaking in an intermittent manner. Impact load imparted to the shift lever 46 can accordingly be effectively absorbed.

FIRST MODIFIED EXAMPLE

The first modified example has substantially the same configuration as the present exemplary embodiment, however differs in the following points. Note that since the shapes of right ribs 30, 32, 34 are formed with the same shapes to the shapes of left ribs 40, 42, 44, explanation is given regarding the left ribs 40, 42, 44, with explanation regarding the right ribs 30, 32, 34 omitted.

Figure 7:
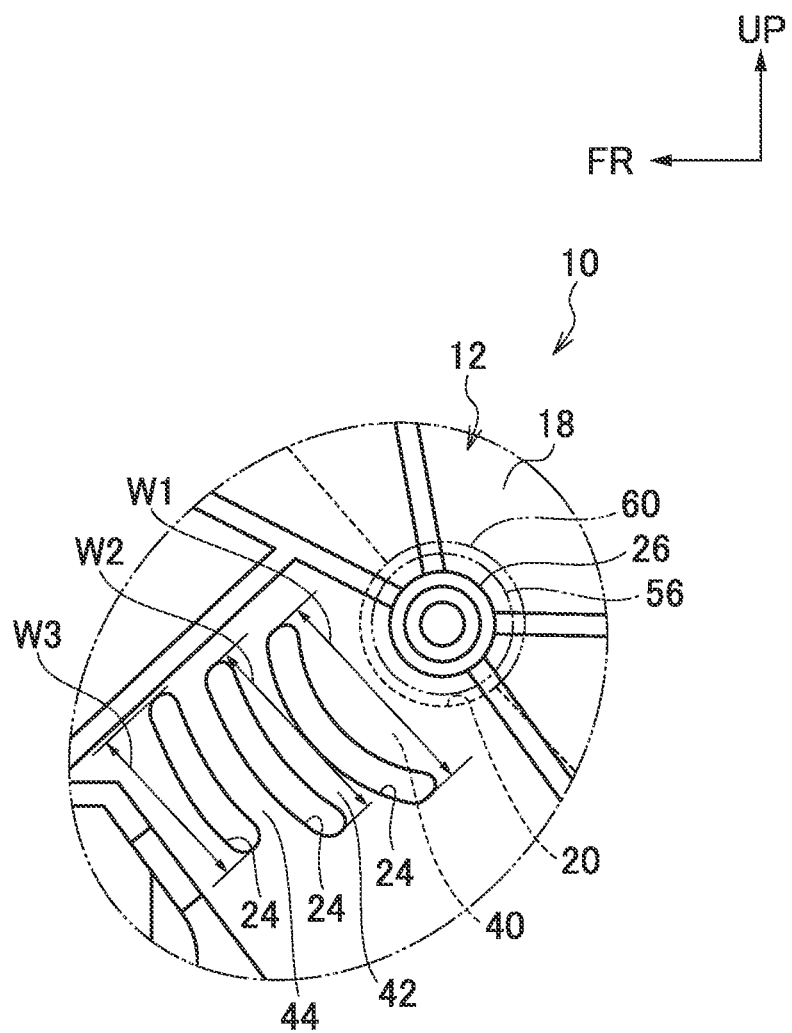
FIG. 7 An enlarged side view illustrating a first modified example of the left ribs illustrated in FIG. 3.

As illustrated in FIG. 7, a width dimension W2 of the left rib 42 of the housing 12 is set smaller than a width dimension W1 of the left rib 40, and a width dimension W3 of the left rib 44 is set smaller than the width dimension W2 of the left rib 42. The width dimension W3 of the left rib 44 is set larger than external diameter dimensions of the left support shaft portion 56 and the left collar 60. The left ribs 40, 42, 44 are disposed in the sequence left rib 40, left rib 42, left rib 44 in a downwards direction on progression towards the vehicle front.

In the event that an impact load greater than the mechanical strength of the left ribs 40, 42, 44 is imparted to the shift lever 46 in a state in which the shift lever 46 is disposed in the "D" shift position, the left ribs 40, 42, 44 are broken similarly to in the embodiment, and the left support shaft portion 56 moves in a direction towards the left rib 44.

Note that since the width dimensions W of the left ribs 40, 42, 44 are set so as to become smaller in the sequence left rib 40, left rib 42, and left rib 44, the left support shaft portion 56 that has moved is converged to the position of the left rib 44. Movement of the left support shaft portion 56 is accordingly guided by the left ribs 40, 42, 44.

As this occurs, since the coupling pin 76 of the shift position link 72 is fit-inserted inside the coupling hole 70 of the control shaft 48, the coupling pin 76 is pressed by the coupling hole 70 and the shift position link 72 attempts to move substantially towards the radial direction outside of the boss 26 (in the movement direction of the left support shaft portion 56). However, movement of the shift position link 72 is prevented since the shift position link 72 is supported by the boss 26 of the housing 12. The coupling pin 76 is accordingly destroyed by the control shaft 48.

When the coupling pin 76 is destroyed, the coupling between the shift position link 72 and the control shaft 48 is released. Accordingly, the shift position link 72 is not rotated even with movement of the shift lever 46. Since the magnetic sensor therefore does not make false detection of the position of the shift lever 46, the shift position of the vehicle is not changed to an unintended shift position. Namely, supposing the coupling pin 76 were not destroyed, the shift position link 72 might be rotated accompanying the movement of the shift lever 46. In such an event, the magnetic sensor might detect the position of the shift lever 46 as being a different shift position to the "D" shift position, so the vehicle shift position being changed to an unintended shift position. However, since the coupling pin 76 is destroyed as described above, such shift position changes are suppressed or prevented.

The first modified example accordingly exhibits similar operation and advantageous effects to the present embodiment. Moreover, when absorbing impact load imparted to the shift lever 46, the movement direction of the shift lever 46 can be set due to setting the respective width dimensions of the left ribs 40, 42, 44 and also setting the placement direction of the left ribs 40, 42, 44, and false detection by the magnetic sensor can be suppressed or prevented.

Note that in the first modified example, the right ribs 30, 32, 34 and the left ribs 40, 42, 44 are disposed along a downwards direction on progression towards the vehicle front, however the placement direction of the right ribs 30, 32, 34 and the left ribs 40, 42, 44 is not limited thereto. For example, it is sufficient for the placement direction of the right ribs 30, 32, 34 and the left ribs 40, 42, 44 to be set such that mainly boss 26 radial direction force acts on the coupling pin 76 from the control shaft 48. Namely, when mainly force along the boss 26 circumferential direction acts on the coupling pin 76 from the control shaft 48, the shift position link 72 rotates about the axis of the boss 26. The coupling pin 76 can accordingly be destroyed provided that force along the boss 26 radial direction acts on the coupling pin 76 from the control shaft 48.

SECOND MODIFIED EXAMPLE

The second modified example has substantially the same configuration as the present embodiment, however differs in the following points. Note that since the shapes of right ribs 30, 32, 34 are formed with similar shapes to the shapes of left ribs 40, 42, 44, explanation is given regarding the left ribs 40, 42, 44, with explanation regarding the right ribs 30, 32, 34 omitted.

Figure 8:
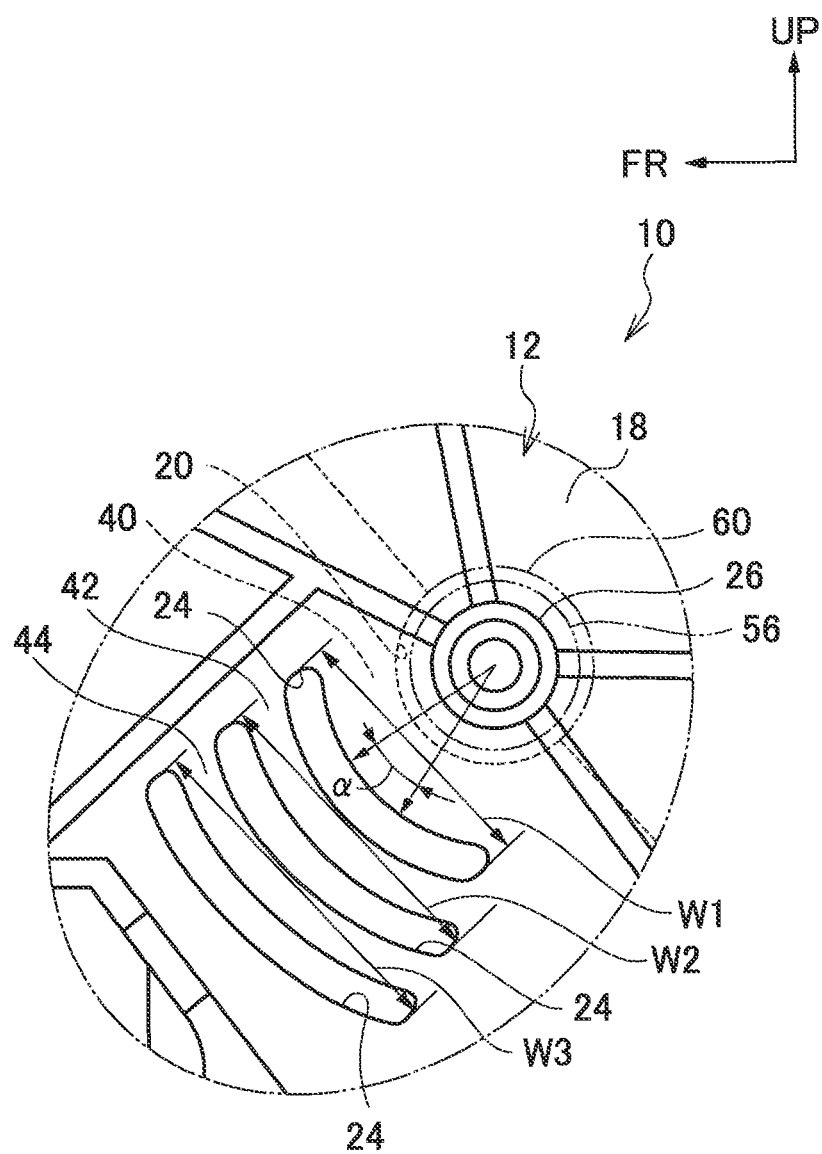
FIG. 8 An enlarged side view illustrating a second modified example of the left ribs illustrated in FIG. 3.

As illustrated in FIG. 8, a width dimension W2 of the left rib 42 of the housing 12 is set larger than a width dimension W1 of the left rib 40, and a width dimension W3 of the left rib 44 is set larger than the width dimension W2 of the left rib 42. The width dimension W1 of the left rib 40 is moreover set larger than the external diameter dimensions of the left support shaft portion 56 and the left collar 60.

The left ribs 40, 42, 44 are broken, similarly to in the present embodiment, in the event that an impact load greater than the mechanical strength of the left ribs 40, 42, 44 is imparted to the shift lever 46. The left ribs 40, 42, 44 are formed so as to face the whole diameter of the left support shaft portion 56, for the impact load direction within the range of the specific angle α illustrated in FIG. 8 due to setting the width dimensions of the left ribs 40, 42, 44 so as to become larger in the sequence left rib 40, left rib 42, left rib 44. Impact load imparted to the shift lever 46 can accordingly be absorbed with respect to impact load directions within the range of the specific angle α.

The second modified example accordingly exhibits similar operation and advantageous effects to the present embodiment. Moreover, impact imparted to the shift lever 46 can be reliably absorbed for impact load directions within the range of the specific angle α.

THIRD MODIFIED EXAMPLE

The third modified example has substantially the same configuration as the present embodiment, however differs in the following points. Note that since the shapes of right ribs 30, 32, 34 are formed with similar shapes to the shapes of left ribs 40, 42, 44, explanation is given regarding the left ribs 40, 42, 44, with explanation regarding the right ribs 30, 32, 34 omitted.

Figure 9:
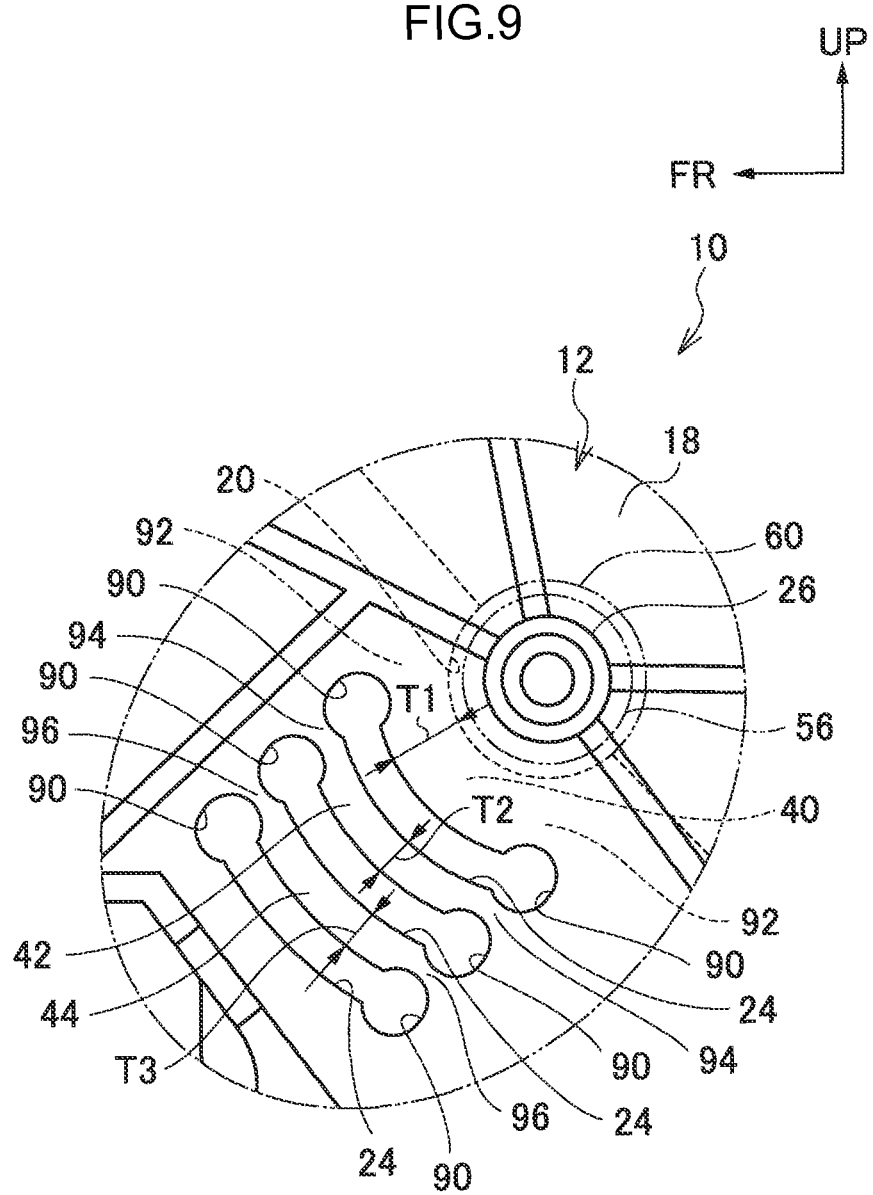
FIG. 9 An enlarged side view illustrating a third modified example of the left ribs illustrated in FIG. 3.

As illustrated in FIG. 9, at both length direction end portions of the respective elongated holes 24 in the housing 12, a pair of substantially circular shaped circular holes 90 are provided. The circular holes 90 are respectively in communication with the elongated hole 24. Thinned portions 92 are accordingly formed at both end portions of the left rib 40, with a thickness dimension of the thinned portions 92 set smaller than the thickness dimension T1 of the left rib 40. Thinned portions 94 are moreover formed at both end portions of the left rib 42, with a thickness dimension of the thinned portions 94 set smaller than the thickness dimension T2 of the left rib 42. Thinned portions 96 are also formed at both end portions of the left rib 44, with a thickness dimension of the thinned portions 96 set smaller than the thickness dimension T3 of the left rib 44. The mechanical strength of the thinned portions 92, 94, 96 is accordingly set lower than the mechanical strength at other locations of the left ribs 40, 42, 44.

Break locations can accordingly be set on the left ribs 40, 42, 44 since the left ribs 40, 42, 44 break at both length direction end portions in the event that an impact load greater than the mechanical strength of the left ribs 40, 42, 44 is imparted to the shift lever 46. The movement direction of the shift lever 46 when absorbing the impact load imparted to the shift lever 46 can accordingly be set by setting the placement direction of the left ribs 40, 42, 44.

Due to the above configuration, the third modified example exhibits similar operation and advantageous effects to the present embodiment. Moreover, the movement direction of the shift lever 46 when absorbing impact load imparted to the shift lever 46 can be set by the thinned portions 92, 94, 96.

FOURTH MODIFIED EXAMPLE

The fourth modified example has substantially the same configuration as the third modified example, however differs in the following points. Note that since the shapes of right ribs 30, 32, 34 are formed with similar shapes to the shapes of left ribs 40, 42, 44, explanation is given regarding the left ribs 40, 42, 44, with explanation regarding the right ribs 30, 32, 34 omitted.

Figure 10:
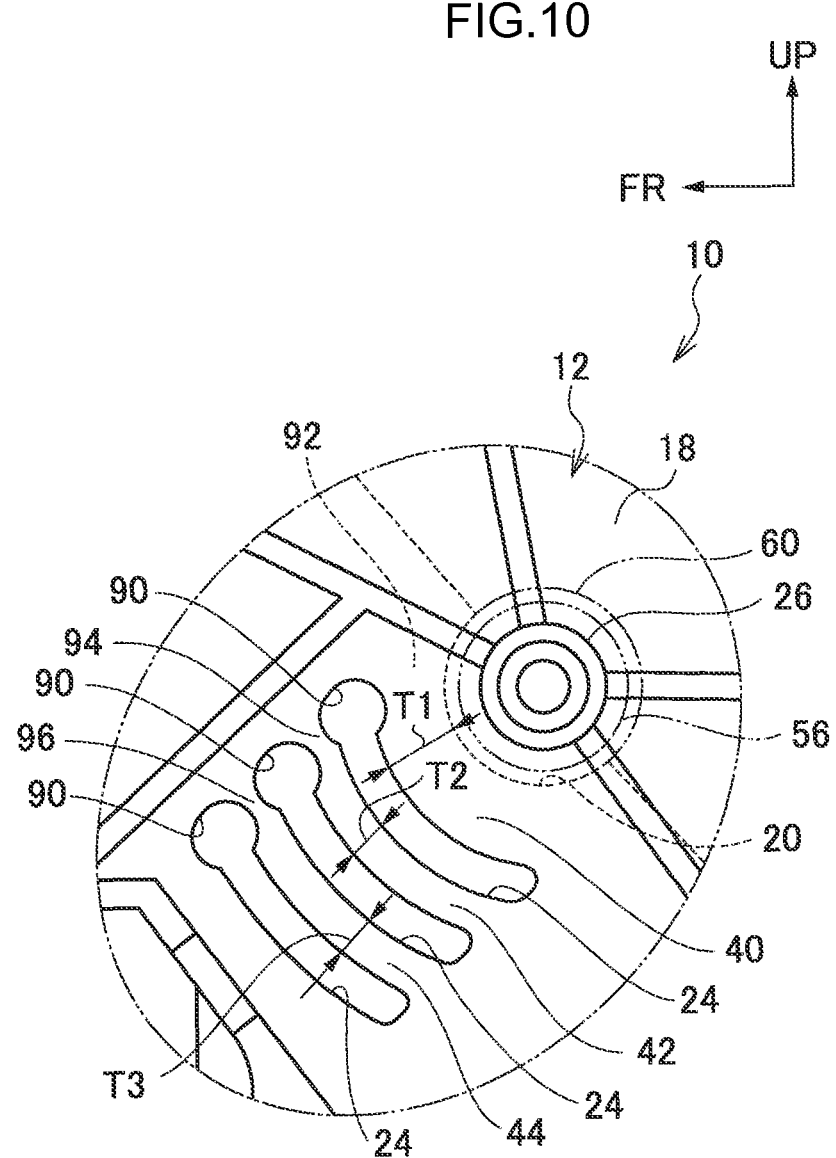
FIG. 10 An enlarged side view illustrating a fourth modified example of the left ribs illustrated in FIG. 3.

As illustrated in FIG. 10, circular holes 90 are provided at length direction one end portions (vehicle front end portions) of the elongated holes 24 of the housing 12, but are not provided at length direction other end portions (vehicle rear end portions) of the elongated holes 24. A thinned portion 92 is thereby formed at the length direction one end portion of the left rib 40, a thinned portion 94 is formed at the length direction one end portion of the left rib 42, and a thinned portion 96 is formed at the length direction one end portion of the left rib 44. The mechanical strength of the thinned portions 92, 94, 96 is accordingly set lower than the mechanical strength of other locations of the left ribs 40, 42, 44.

Break locations can accordingly be set on the left ribs 40, 42, 44 since the left ribs 40, 42, 44 break at the length direction one end portions in the event that an impact load greater than the mechanical strength of the left ribs 40, 42, 44 is imparted to the shift lever 46. The movement direction of the shift lever 46 when absorbing the impact load imparted to the shift lever 46 can accordingly be set by setting the placement direction of the left ribs 40, 42, 44.

The fourth modified example accordingly exhibits similar operation and advantageous effects to the third modified example.

FIFTH MODIFIED EXAMPLE

The fifth modified example has substantially the same configuration as the third modified example, however differs in the following points. Note that since the shapes of right ribs 30, 32, 34 are formed with similar shapes to the shapes of left ribs 40, 42, 44, explanation is given regarding the left ribs 40, 42, 44, with explanation regarding the right ribs 30, 32, 34 omitted.

Figure 11:
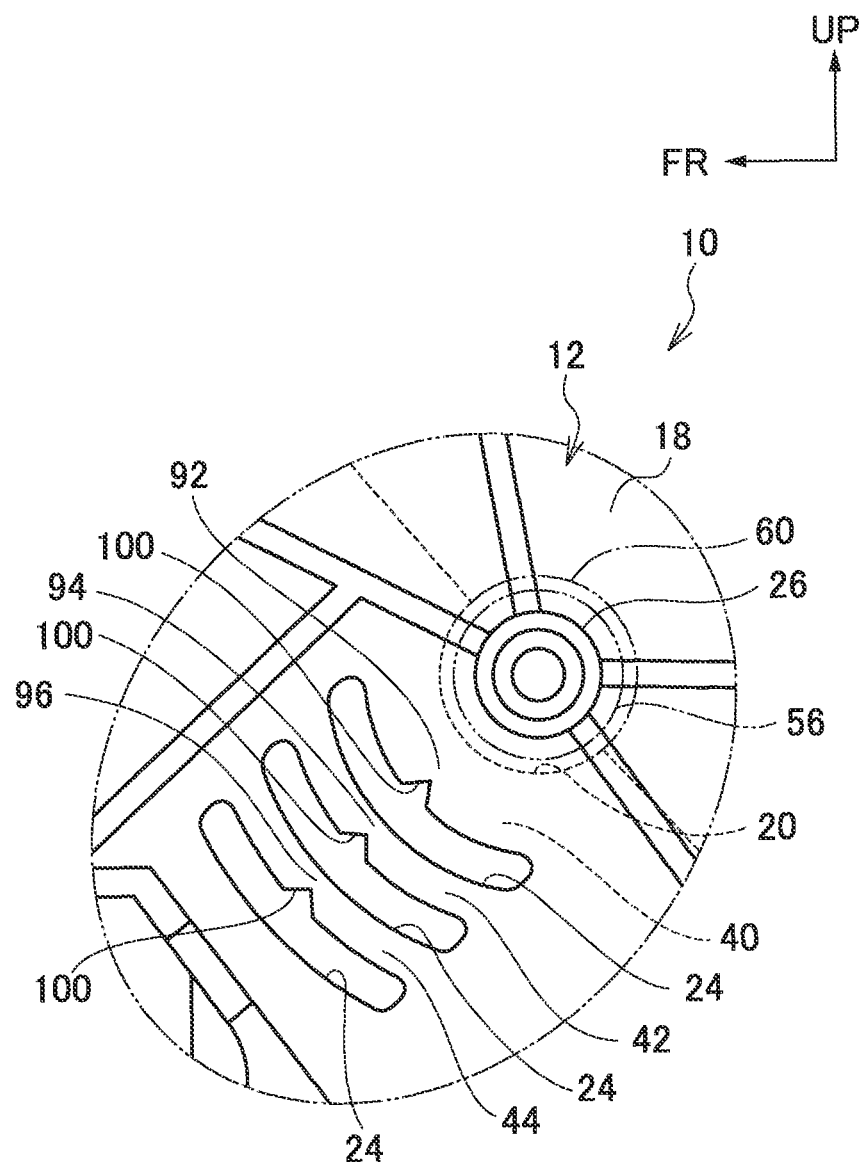
FIG. 11 An enlarged side view illustrating a fifth modified example of the left ribs illustrated in FIG. 3.

As illustrated in FIG. 11, the elongated holes 24 are not provided with the circular holes 90. Substantially triangular shaped recessed portions 100 are provided at left shaft receiving portion 20 radial direction outside portions of length direction intermediate portions of the left ribs 40, 42, 44. The recessed portions 100 are open towards the left shaft receiving portion 20 radial direction outside. Thinned portions 92, 94, 96 are thereby provided at length direction intermediate portions of the left ribs 40, 42, 44, with the mechanical strength of the thinned portions 92, 94, 96 set lower than the mechanical strength of other locations of the left ribs 40, 42, 44.

The fifth modified example accordingly exhibits similar operation and advantageous effects to the third modified example.

Note that in the fifth modified example, the recessed portions 100 are formed in substantially triangular shapes, however the shape of the recessed portions 100 is not limited thereto. For example, the recessed portions 100 may be formed with substantially rectangular shapes, or the recessed portions 100 may be formed with substantially semicircular shapes. Namely, it is sufficient for the mechanical strength of the thinned portions 92, 94, 96 to be set lower than the mechanical strength of other locations of the left ribs 40, 42, 44.

In the fifth modified example, the recessed portions 100 are disposed at length direction intermediate portions of the left ribs 40, 42, 44, however the positions of the recessed portions 100 may be set as appropriate. The movement direction of the shift lever 46 when absorbing impact load imparted to the shift lever 46 can accordingly be set as appropriate.

Moreover, in the fifth modified example, one recessed portion 100 is provided at each of the left ribs 40, 42, 44, however plural recessed portions 100 may be provided at each of the left ribs 40, 42, 44. Dependency on the impact load direction when absorbing impact load imparted to the shift lever 46 can accordingly be further suppressed.

SIXTH MODIFIED EXAMPLE

The sixth modified example has substantially the same configuration as the present embodiment, however differs in the following points. Note that since the shapes of right ribs 30, 32, 34 are formed with similar shapes to the shapes of left ribs 40, 42, 44, explanation is given regarding the left ribs 40, 42, 44, with explanation regarding the right ribs 30, 32, 34 omitted.

Figure 12:
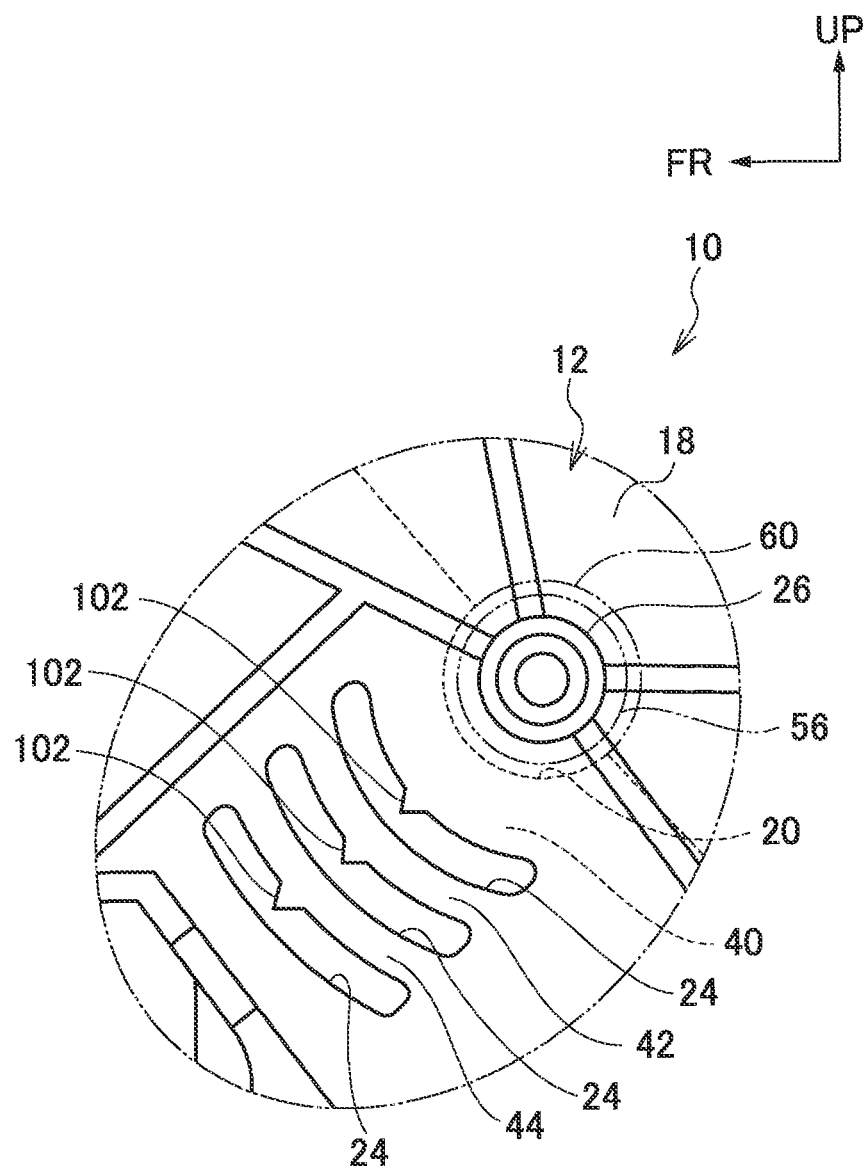
FIG. 12 An enlarged side view illustrating a sixth modified example of the left ribs illustrated in FIG. 3.

As illustrated in FIG. 12, projection portions 102 of substantially triangular cross-section profile are provided at left shaft receiving portion 20 radial direction outside portions of length direction intermediate portions of the left ribs 40, 42, 44. The projection portions 102 project out from the left ribs 40, 42, 44 towards the left shaft receiving portion 20 radial direction outside.

In the event that an impact load greater than the mechanical strength of the left ribs 40, 42, 44 is imparted to the shift lever 46, the left rib 40 is displaced towards the left shaft receiving portion 20 radial direction outside and breaks. As this occurs, the projection portion 102 of the left rib 40 abuts the left rib 42, such that the impact load is concentrated in the left rib 42 at the location abutted by the projection portion 102. The left rib 42 accordingly breaks at the location abutted by the projection portion 102. As the left rib 42 is broken, the projection portion 102 of the left rib 42 abuts the left rib 44, such that the impact load is concentrated in the left rib 44 at the location abutted by the projection portion 102. The left rib 44 accordingly breaks at the location abutted by the projection portion 102.

The sixth modified example accordingly exhibits similar operation and advantageous effects to the present embodiment. Moreover, the movement direction of the shift lever 46 during absorption of impact load can be set by the projection portions 102 since the positions at which the left rib 42 and the left rib 44 break can be set by the projection portions 102.

Note that in the sixth modified example, the projection portions 102 are formed with substantially triangular shaped cross-section profiles, however there is no limitation of the cross-section profile of the projection portions 102 thereto. For example, the projection portions 102 may be formed with substantially rectangular shaped cross-section profiles, or the projection portions 102 may be formed with substantially semicircular shaped cross-section profiles. Namely, it is sufficient that the projection portions 102 are formed so as to be respectively capable of abutting the left rib 42 and the left rib 44.

Moreover, in the sixth modified example, the projection portions 102 are disposed at length direction intermediate portions of the left ribs 40, 42, 44, however the positions of the projection portions 102 may be set as appropriate. The movement direction of the shift lever 46 when absorbing impact load imparted to the shift lever 46 can accordingly be set as appropriate.

Moreover, in the sixth modified example, one projection portion 102 is provided at each of the left ribs 40, 42, 44, however plural projection portions 102 may be provided at each of the left ribs 40, 42, 44. Dependency on the impact load direction when absorbing impact load imparted to the shift lever 46 can accordingly be further suppressed.

SEVENTH MODIFIED EXAMPLE

The seventh modified example has substantially the same configuration as the present embodiment, however differs in the following points. Note that since the shapes of right ribs 30, 32, 34 are formed with similar shapes to the shapes of left ribs 40, 42, 44, explanation is given regarding the left ribs 40, 42, 44, with explanation regarding the right ribs 30, 32, 34 omitted.

Figure 13:
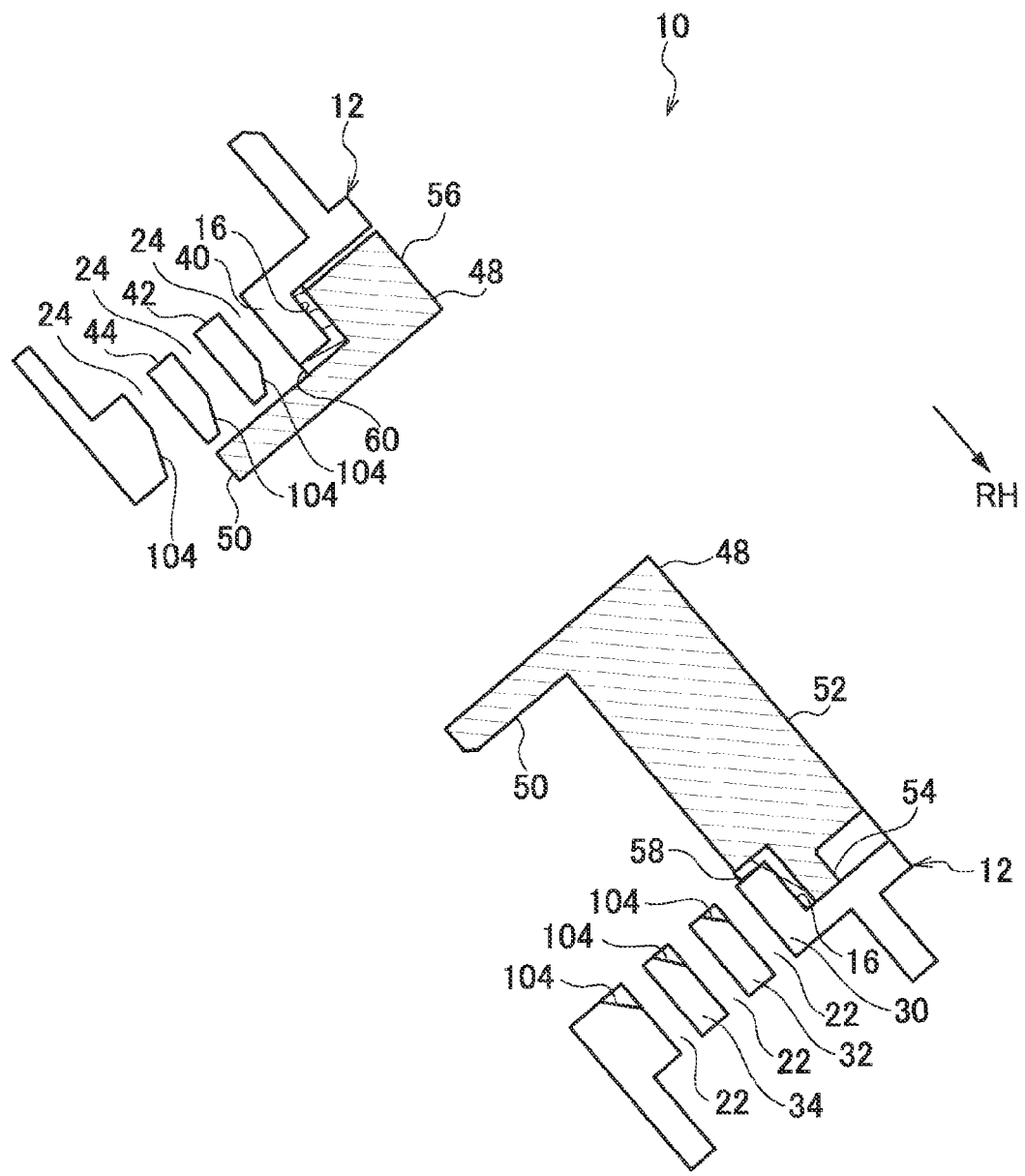
FIG. 13 A cross-section illustrating a seventh modified example in which a portion of the shift lever device illustrated in FIG. 5 has been modified.

As illustrated in FIG. 13, inclined portions 104 are provided at upper edge portions of left support shaft portion 56 side (inside) edge portions of the left rib 42 and the left rib 44. The inclined portion 104 is inclined towards the left shaft receiving portion 20 radial direction outside on progression towards the left support shaft portion 56 side.

The left ribs 40, 42, 44 break similarly to in the present embodiment in the event that an impact load greater than the mechanical strength of the left ribs 40, 42, 44 is imparted to the shift lever 46. Moreover, as the left rib 40 breaks, the broken left rib 40 moves smoothly towards the left support shaft portion 56 radial direction outside together with the movement of the shift lever 46 due to the inclined portion 104. As the left rib 42 breaks, the broken left rib 42 moves smoothly towards the left support shaft portion 56 radial direction outside together with the shift lever 46 due to the inclined portion 104.

Even supposing the left rib 42 were not to break, the left support shaft portion 56 would still move towards the left shaft receiving portion 20 radial direction outside due to the left support shaft portion 56 sliding on the inclined portion 104 whilst deflecting the left rib 42. Impact load imparted to the shift lever 46 can accordingly be absorbed even in such cases.

The seventh modified example accordingly exhibits similar operation and advantageous effects to the present embodiment. The shift lever 46 is moreover able to move smoothly towards the left support shaft portion 56 radial direction outside due to the inclined portions 104.

Note that in the embodiment and in the first modified example to the seventh modified example, the 3 left ribs 40, 42, 44 and the 3 right ribs 30, 32, 34 are respectively provided to the housing 12, however the number of the left ribs 40, 42, 44 and the right ribs 30, 32, 34 may be set as appropriate. The impact resistance load with respect to impact load imparted to the shift lever 46 can accordingly be set with ease.

Moreover, in the embodiment and in the first modified example to the seventh modified example, the thickness dimension T1 of the left rib 40 (right rib 30) is set slightly larger than the thickness dimensions T2, T3 of the left ribs 42, 44 (right ribs 32, 34), however the thickness dimensions of the left ribs 40, 42, 44 and the right ribs 30, 32, 34 may be set as appropriate. For example, the thickness dimension T1 of the left rib 40 (right rib 30) may be set with the same dimension to the thickness dimensions T2, T3 of the left ribs 42, 44 (right ribs 32, 34). The impact resistance load with respect to impact load imparted to the shift lever 46 can accordingly be easily set.

Moreover, in the embodiment and in the first modified example to the seventh modified example, the left ribs 40, 42, 44 (right ribs 30, 32, 34) are respectively set such that the thickness dimensions T1, T2, T3 are uniform. However, the thickness dimensions T1, T2, T3 of the left ribs 40, 42, 44 (right ribs 30, 32, 34) do not have to be set so as to be uniform. For example in the case of the left rib 42, a left support shaft portion 56 radial direction inside face of the left rib 42 may have a different curvature to a left support shaft portion 56 radial direction outside face of the left rib 42.

In the embodiment and in the first modified example to the seventh modified example, the length direction length of the left ribs 40, 42, 44 and the right ribs 30, 32, 34 may be set as appropriate. For example, the range of the specific angle α illustrated in FIG. 4 may be increased by extending the left rib 40 and the right rib 30 in a range of substantially 180 degrees about the periphery of the left shaft receiving portion 20 and the right shaft receiving portion 16. Moreover, for example the length direction lengths of the left ribs 40, 42, 44 and the right ribs 30, 32, 34 may be set with lengths corresponding to all of the shift positions of the shift lever 46, such that impact load can be absorbed at every shift position of the shift lever 46.

Moreover, in the embodiment and in the first modified example to the seventh modified example, the shift lever device 10 is configured installed to a vehicle instrument panel, however configuration may be made wherein the shift lever device 10 is installed to a floor portion of the vehicle compartment.

Moreover, in the embodiment and in the first modified example to the seventh modified example, the operation groove is of a type formed in a specific zigzag shape (what is referred to as a "gate type"), however the operation groove may be configured as a type that extends in a linear shape along the shift direction (what is referred to as a "straight type").

Moreover, combinations of the embodiment and the first modified example to the seventh modified example described above can be implemented as appropriate.

The invention claimed is:

1. A shift device comprising:
a shift operation member that includes a support shaft portion provided along a vehicle width direction, and that is configured to be capable of rotation operation about an axis of the support shaft portion;
a support body that includes a support portion that supports the support shaft portion rotatably; and
a weakened portion that is provided at the support body, the weakened portion extending around a circumferential direction of the support portion at a lower side in an axial direction of the shift operation member and at a periphery of the support portion, and a width dimension of the weakened portion being set larger than a diameter dimension of the support shaft portion,
wherein the weakened portion is curved and circumferentially extends around the support portion for an angle α such that an impact load applied along an axis of the shift operation member within the range of the angle α can be absorbed by the breaking of the weakened portion.

2. The shift device of claim 1, wherein plural weakened portions are provided along a direction separated from the support shaft portion.

3. The shift device of claim 2, wherein width dimensions of the weakened portions are set so as to increase the further the weakened portions are disposed in the direction separated from the support shaft portion.

4. The shift device of claim 2, wherein width dimensions of the weakened portions are set so as to decrease the further the weakened portions are disposed in the direction separated from the support shaft portion.

5. The shift device of claim 2, further comprising a thinned portion that is provided at the weakened portion, a thickness dimension of the thinned portion being set smaller than a thickness dimension of the weakened portion.

6. The shift device of claim 2, further comprising a projection portion that is provided at the weakened portion and that projects out towards a weakened portion disposed at an opposite side of the weakened portion from the support shaft portion.

7. The shift device of claim 4, further comprising a coupling body that is rotatably supported on the support body, that includes a coupling portion coupled to the shift operation member, that is rotated interlockingly with the rotation operation of the shift operation member, and that is configured to enable detection of a position to which the shift operation member is operated by being rotated,
wherein the shift operation member destroys the coupling portion in a case in which an impact load is imparted to the shift operation member.

8. The shift device of claim 7, wherein:
the coupling portion is formed in a shaft shape, and
a coupling hole into which the coupling portion is inserted, the coupling hole being formed at the shift operation member.

9. The shift device of claim 2, further comprising an inclined portion that is provided at an edge portion at an inner side of the weakened portion, and that is inclined towards the direction separated from the support shaft portion on progression towards the inner side of the weakened portion.

10. The shift device of claim 1, wherein the weakened portion includes a rib formed at the support body.

11. The shift device of claim 1, wherein the weakened portion includes a plurality of ribs formed at the support body.

12. The shift device of claim 1, wherein the weakened portion includes a plurality of ribs formed at the support body, said ribs being arranged along a direction separated from the support shaft portion such that the ribs are arranged in a axial direction of the shift operation member.

13. The shift device of claim 1, wherein the support body includes wall portions facing in the vehicle width direction, and the weakened portion includes a rib formed at one of the wall portions.

14. The shift device of claim 1, wherein the support body includes wall portions facing in the vehicle width direction, and the weakened portion includes at least one rib integrally formed in one of the wall portions.

* * * * *